United States Patent [19]

Oltman et al.

[11] 4,239,195

[45] Dec. 16, 1980

[54] WORKBENCH

[75] Inventors: John P. Oltman, Cedar Falls, Iowa; Emerson V. Purkapile, Chicago, Ill.

[73] Assignee: Waterloo Industries, Inc., Waterloo, Iowa

[21] Appl. No.: 54,231

[22] Filed: Jul. 2, 1979

[51] Int. Cl.[3] .............................................. B23Q 3/02

[52] U.S. Cl. ...................................... 269/16; 269/212; 269/258; 269/901; 144/286 R

[58] Field of Search ................................ 269/212-215, 269/16, 258, 321 CF; 144/285, 286 R

[56] References Cited

U.S. PATENT DOCUMENTS

| | | | |
|---|---|---|---|
| 286,345 | 10/1883 | Thorp | 269/215 |
| 1,638,848 | 8/1927 | Hargrave | 269/212 |
| 4,068,551 | 1/1978 | Kreitz | 144/286 R X |
| 4,133,360 | 1/1979 | Sanfilippo et al. | 144/286 R |
| 4,199,135 | 4/1980 | Wöhrle et al. | 269/321 CF X |

FOREIGN PATENT DOCUMENTS

| | | | |
|---|---|---|---|
| 2630 | of 1905 | United Kingdom | 269/215 |

*Primary Examiner*—Robert C. Watson

*Attorney, Agent, or Firm*—Allegretti, Newitt, Witcoff & McAndrews

[57] ABSTRACT

An improved workbench includes collapsible legs, tool holders attachable to the legs, extensible auxiliary support legs, a generally planar bench top with a removable section for power tools and a pair of adjustable vises cooperative with the planar top. The adjustable vises include a mechanism for gross and fine adjustment and additionally include gripping jaws that are pivotal.

19 Claims, 14 Drawing Figures

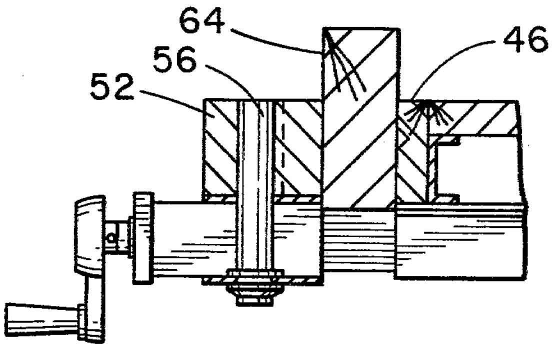
FIG. 12
FIG. 13
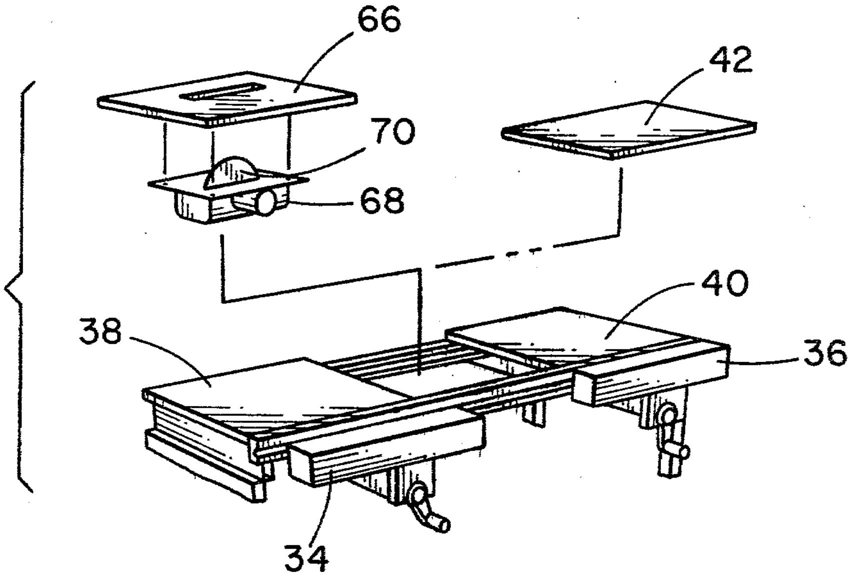
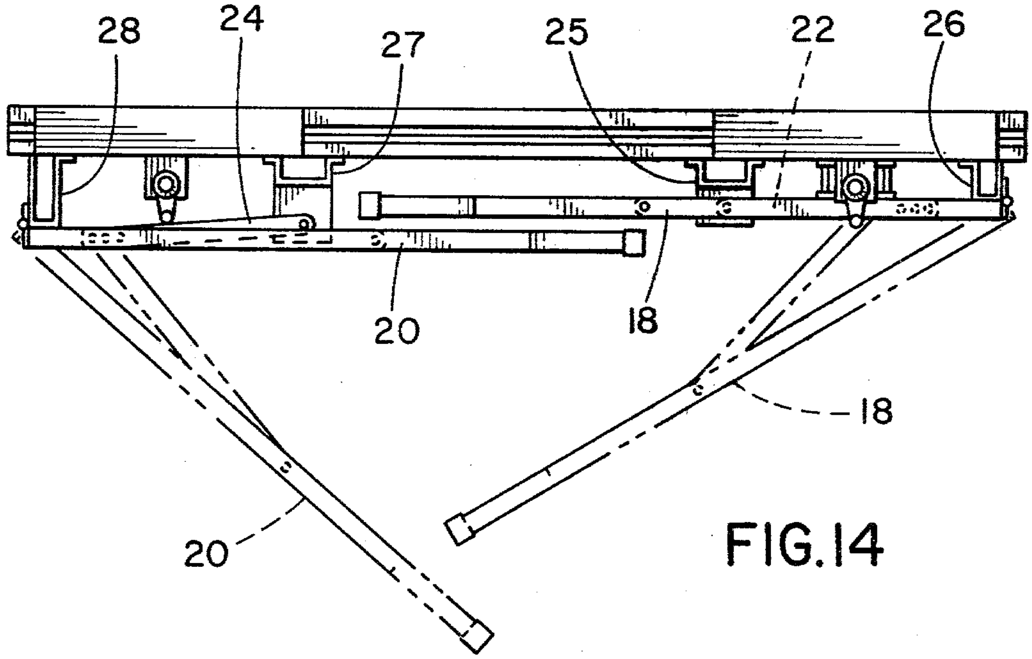
FIG. 14

WORKBENCH

BACKGROUND OF THE INVENTION

In a principal aspect the present invention relates to a workbench, and more particularly to a collapsible workbench with an improved vise for holding a workpiece.

Tradesmen as well as hobby craftsmen often utilize a workbench. Heretofore many workbench designs have been suggested. A typical design is shown in Larson, U.S. Pat. No. 2,587,177. Larson discloses a folding workbench having a generally planar top and collapsible legs. Skripsky in U.S. Pat. No. 3,734,151 discloses a workbench which is collapsible and also includes openings in the top of the workbench for attachment of power tools.

Hickman, in U.S. Pat. No. 3,615,087, discloses a workbench design which is made by Black & Decker Company and sold under the tradename Workmate. The Hickman disclosure teaches a workbench with two separate planar members forming the top of the bench. The planar members are controlled by a pair of independently operable clamp rods. These rods may be screwed to control the separation of the top members forming the bench.

Young in U.S. Pat. No. 2,555,217 discloses an accessory for a workbench; namely, extensible legs which may be attached to the workbench to provide additional support for oversized work pieces. Numerous additional patents disclose structure and accessories for workbenches generally similar to those reviewed. Included among these additional references are the following U.S. patents:

U.S. Pat. No. 2,599,096—Dirksen
U.S. Pat. No. 2,722,243—Nagy
U.S. Pat. No. 3,342,226—Marcoux et al
U.S. Pat. No. 3,841,619
U.S. Pat. No. 3,861,432—Rothenberger
U.S. Pat. No. 4,034,684—Carson et al
U.S. Pat. No. 4,061,305—Beekenkamp
U.S. Pat. No. 4,061,323—Beekenkamp
U.S. Pat. No. 4,062,390—Beekenkamp
U.S. Pat. No. 4,068,550—Gray et al
U.S. Pat. No. 4,068,551—Kreitz
U.S. Pat. No. 4,069,849—O'Grady
U.S. Pat. No. 4,073,484—Beekenkamp
U.S. Pat. No. 4,084,803—Beekenkamp
U.S. Pat. No. 4,105,055—Brenta
U.S. Pat. No. 4,114,665—Decker
U.S. Pat. No. 230,801—Hickman While each of the prior art references disclose workbenches which are satisfactory in their operation, an improved collapsible workbench compatible with numerous accessories is a desirable product. Such a workbench would desirably cooperate with extensible leg members and with separate power tools. Such a bench should also include some mechanism for clamping a workpiece, preferably an adjustable vise.

SUMMARY OF THE INVENTION

In a principal aspect, the present invention comprises an improved workbench which includes the desired aspects of a generally planar top, work surface, collapsible legs and a vise cooperative with the top for supporting a workpiece. Additionally, the workbench includes tool holders which are attached or attachable to the collapsible legs and a top which is cooperative with various power tools. An important feature of the invention is the construction of the vise used in combination with the workbench. The vise includes means for providing a gross adjustment of the separation of the jaws of the vise as well as a fine adjustment.

Thus, it is an object of the invention to provide an improved workbench.

Another object of the invention is to provide a workbench which has collapsible legs and may be folded into a compact configuration for storage.

Another object of the invention is to provide a workbench having a top with a side edge rail cooperative with the movable jaw of a vise.

Still a further object of the present invention is to provide a workbench having a vise which is easily adjustable and includes a gross adjustment as well as a fine adjustment mechanism.

Another object of the present invention is to provide a workbench which is sturdy, economical, and useful for a wide range of purposes.

These and other objects, advantages and features of the invention will be set forth in the detailed description which follows.

BRIEF DESCRIPTION OF THE DRAWING

In the detailed description which follows reference will be made to the drawing comprised of the following figures:

FIG. 12 is a side cross sectional view of the jaws of FIG. 11 taken along the line 12—12;

FIG. 13 is a perspective view illustrating incorporation of accessory panels in the top of the workbench of the present invention; and FIG. 14 is an elevation illustrating the collapsible leg feature of the invention.

DESCRIPTION OF THE PREFERRED EMBODIMENT

Figure 1:
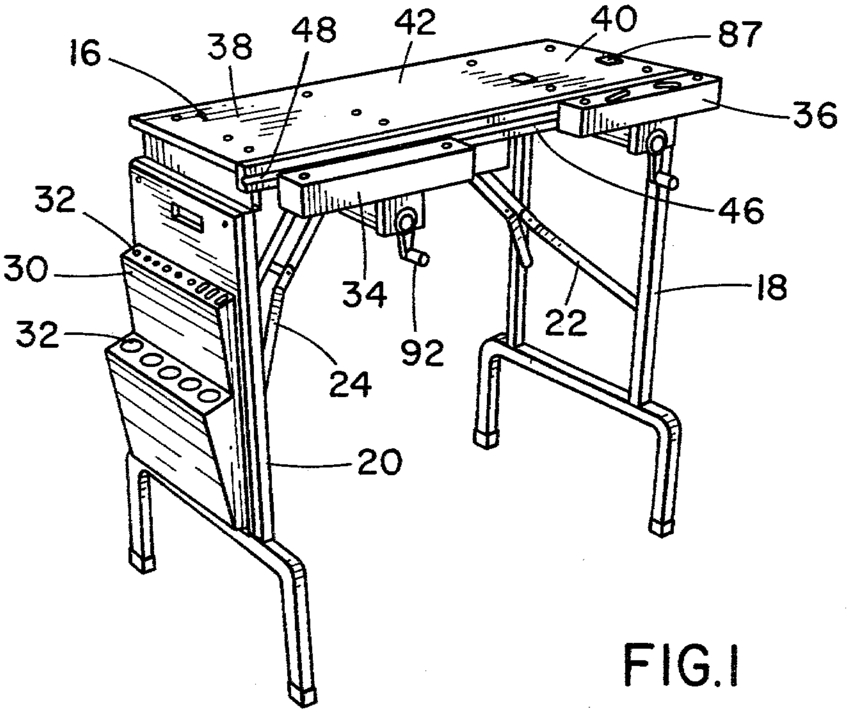
FIG. 1 is a perspective view of the workbench of the present invention.
Figure 4:
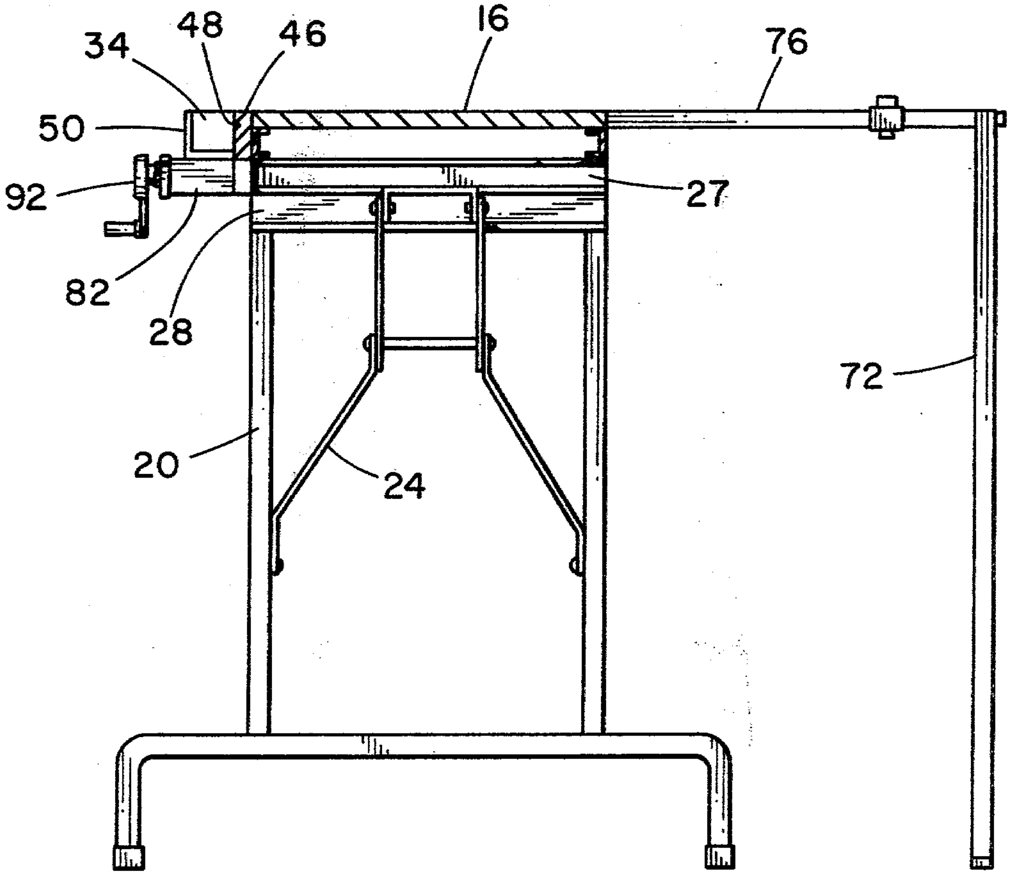
FIG. 4 is a cross sectional view of the workbench taken substantially along the line 4—4 in FIG. 2.

Referring to FIGS. 1, 4 and 14, the workbench of the present invention generally includes a planar top 16 supported by leg assemblies or legs 18 and 20 connected respectively by hinges to cross members 26, 28 of frame 44. Collapsible brackets 22 and 24 support the legs 18 and 20 respectively by interconnecting the legs 18 and 20 respectively with cross members 25, 27 of frame 44 for the top 16 as shown more clearly in FIGS. 2 and 14. The legs 18 are longer than the legs 20 inasmuch as the legs 18 are attached to bracket cross member 26 which projects a foreshortened distance from the top 16 with respect to bracket cross member 28 for the leg 20. This enables the legs 18 to fold inwardly as shown in FIG. 14 with the legs 20 then folded over the legs 18.

Figure 2:
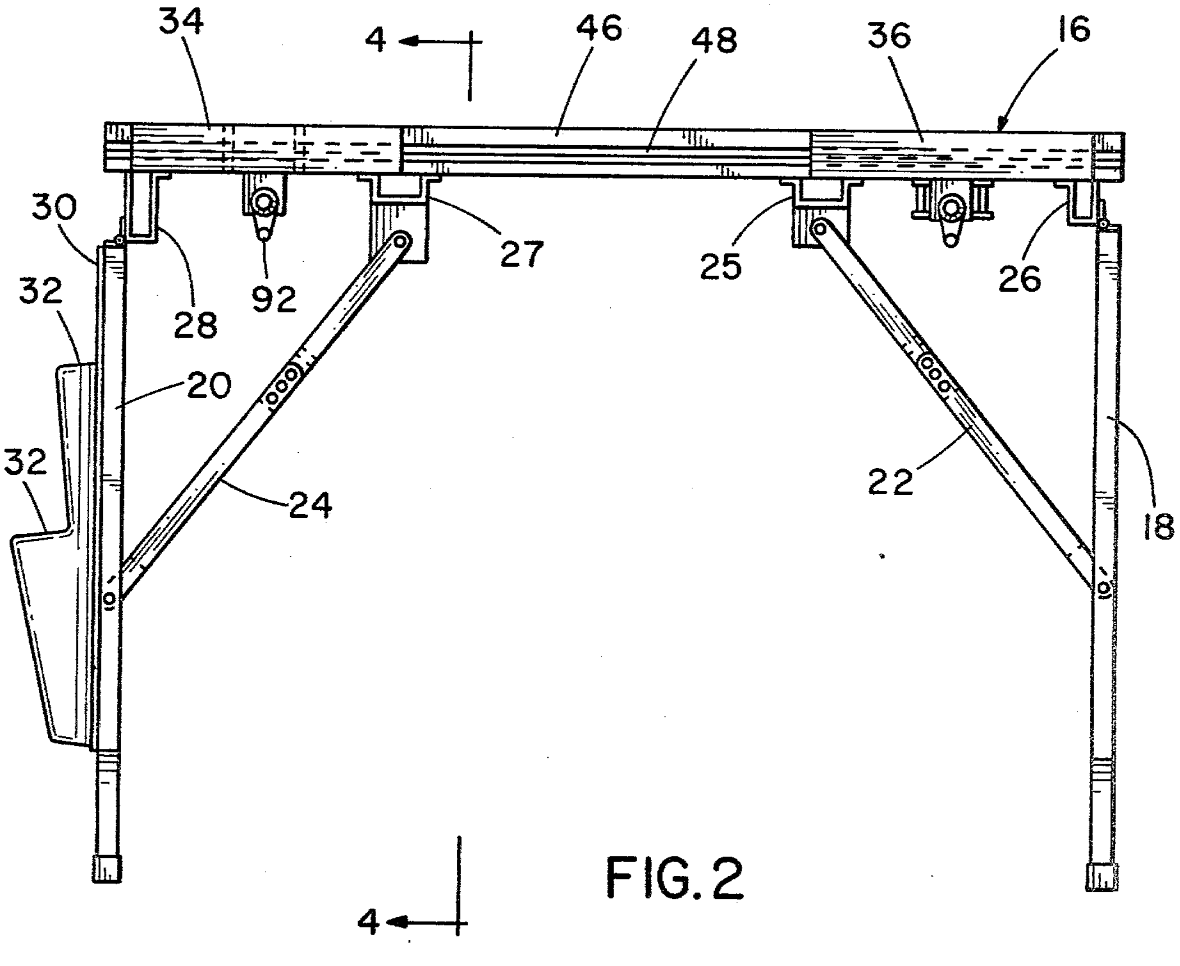
FIG. 2 is a front elevation of the workbench as shown in FIG. 1.

The legs 18, 20 receive a molded plastic tool pocket assembly 29, 30 attached thereto as shown in FIGS. 1, 2 and 14. Importantly, if pocket assembly 29 is removed, legs 18 may fold inwardly to permit the tool pocket assembly 30 associated with legs 20 to face outwardly when the workbench of the present invention is in the folded configuration as shown in FIG. 14. Preferably, both tool pocket assemblies or tool holders 29, 30 are to be removed prior to folding of the legs 18, 20 of the workbench.

The pocket assembly or hand tool holder 30 is comprised of a molded plastic sheet with integrally molded plastic pockets 32. The pockets 32 are adapted to receive various tools such as screwdrivers, pliers and the like for easy access when the workbench is being used. The assembly 30 is temporarily attached to the legs 18 or 20 by support screws which provide hangers for the holder or assembly 30. Alternatively, it may be held on the leg 20 by means of removable clips or the like. The design of the tool holder 29, 30 is variable. Small openings and slots for hand tools may be provided. Larger pockets may be provided for power tools such as drills and the like.

The top 16 is generally planar and is comprised of permanent side sections 38 and 40 and a removable center section 42. Alternatively, a single planar top may be provided. Such a top can be easily replaced by a multi-section top. The sections 38, 40 and 42 are attached to rectangular frame 44 which forms a support base. Generally the side sections 38 and 40 are permanently affixed to the frame 44. The center section 42 is removably attached thereto. A side edge rail 46 extends along the length of the top 16 and is permanently affixed to the frame 44. A groove 48 is defined in the side edge rail 46.

A first and a second vise 34 and 36 are attached to the top 16. Each vise 34 and 36 has a substantially identical construction. Thus, the following description relative to one of the vises is to apply to both.

The side edge rail 46 defines the fixed jaw for each of the vises 34 and 36. Thus, vise 34 includes a movable block or jaw 50 cooperative with the fixed edge rail 46 to define vise grip jaws.

Figure 3:
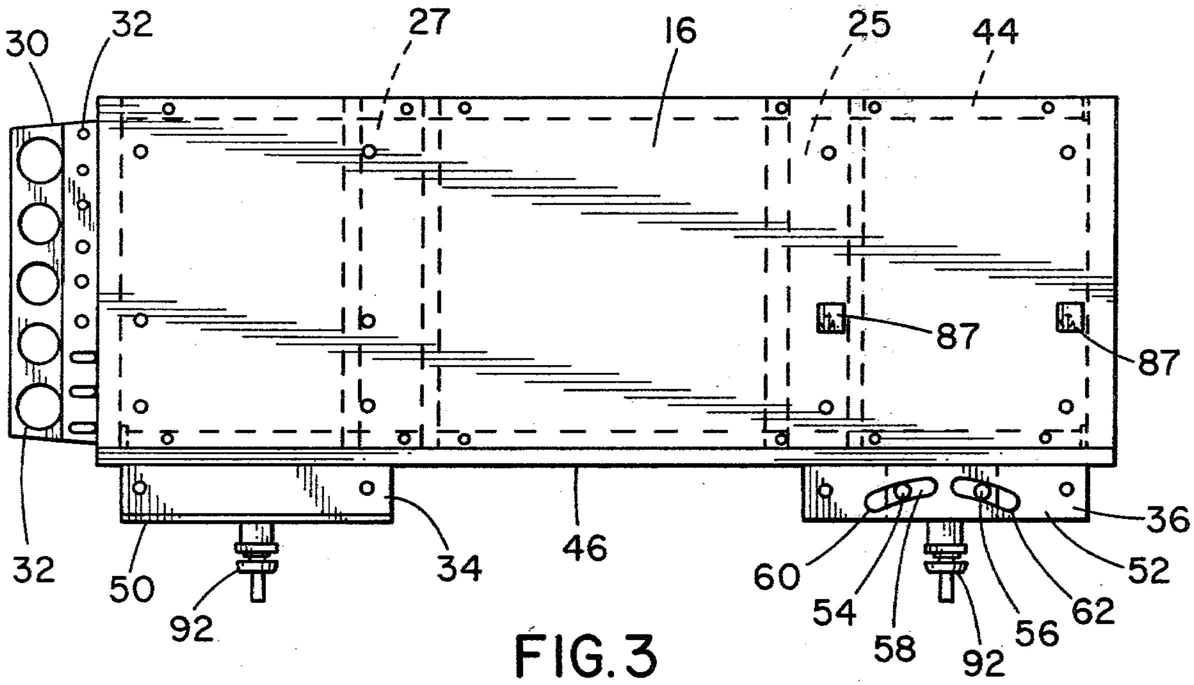
FIG. 3 is a top plan view of the improved workbench.
Figure 11:
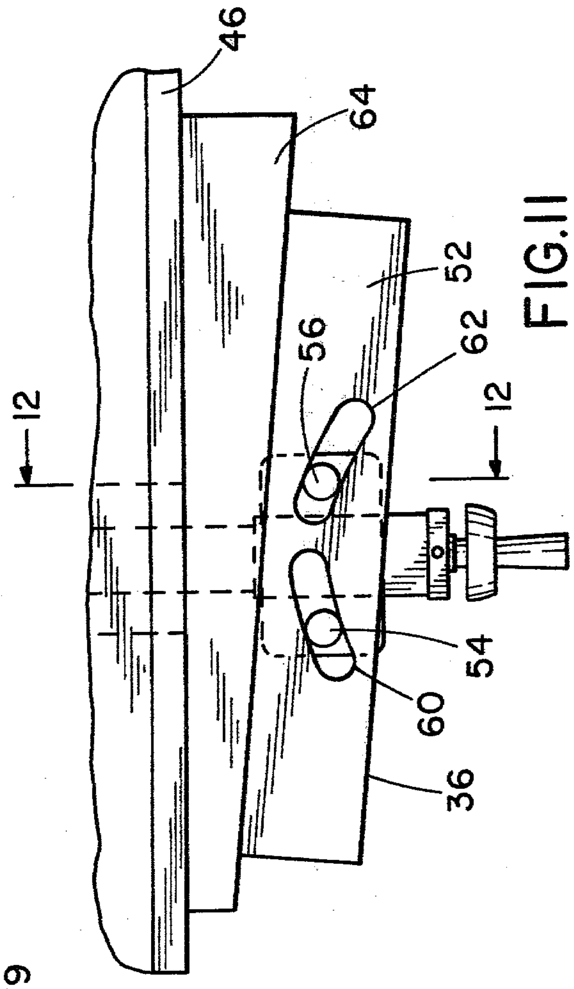
FIG. 11 is a top plan view of the gripping jaws associated with the vise.
Figure 9:
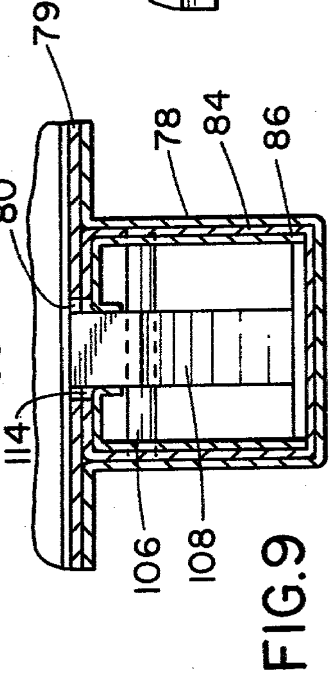
FIG. 9 is a cross sectional view of the vise taken along the line 9—9 in FIG. 8.
Figure 10:
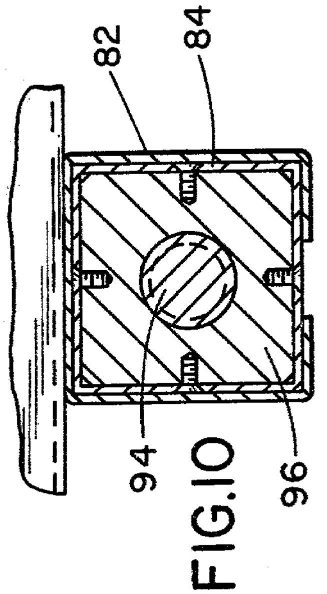
FIG. 10 is a cross section of the vise mechanism taken along the line 10—10 in FIG. 8.

The vise 36 includes a block 52 of special construction as more clearly shown in FIGS. 3, 11 and 12. That is, pins 54 and 56 project upwardly from a plate 58 affixed to the movable portion or plate 58 of the vise 36. The block 52 includes arcuate slots 60 and 62 which receive respectively pins 54 and 56. The block 52 slidably rests on the plate 58. The block 52 may then slide with respect to the pins 54 and 56 or pivot on the plate 58 to thereby accommodate various shapes of a workpiece 64 between the block 52 and edge rail 46 as shown in FIG. 11. Thus, wedge-shaped workpiece 64 may be inserted or positioned against edge rail 46 and retained snuggly in that position by the block 52 which becomes inclined as shown in FIG. 11.

FIGS. 5–10 further illustrate the improved vise mechanism incorporated with the workbench of the present invention in greater detail. The vise mechanism includes a three sided fixed sleeve or tube 78 which is attached to a flat, top plate 79 which, in turn, is attached to the underside of the frame 44. In the embodiment shown the sleeve or tube 78 in combination with plate 79 has a square, hollow cross section and extends from the front edge of rail 46 to the backside of top 16. A series of transverse slots 80 are defined in the top plate 79 for cooperation with a pawl 104 as described hereinafter.

A movable jaw assembly is comprised of three concentric telescoping tubes or sleeves 82, 84 and 86. Tubes 84 and 86 are slidably positioned slidably within the sleeve 78. The outer sleeve 82 has a cross sectional dimension substantially identical to the dimensions of sleeve 78 and is limited in travel to the right in FIGS. 5–8 by engaging the front of sleeve 78. The block support plate 58 is mounted on sleeve 78. The outer sleeve 82 slidably receives middle sleeve 84 which, in turn, slidably receives inner sleeve 86. The middle sleeve 84 is slidably received by the fixed sleeve 78. Though the sleeves 78, 82, 84 and 86 are illustrated as square in cross section, any cross sectional shape should be operative provided the sleeves or equivalent structure telescope in the manner described or function in the manner described.

A cap 90 is attached over the front end of sleeve 82. A handle 92 is attached to a threaded rod 94 extending through opening 102 in cap 90. Opening 102 serves as a bearing surface. Rod 94 is threaded through a block 96. Block 96 is, in turn, affixed to middle sleeve 84. The opposite end of the rod 94 is supported in a bearing opening 98 defined in an end plate or cap 100 of sleeve 86.

The rod 94 is thus rotatably supported in cap 90 and cap 100. The relative position of sleeves 82 and 86 is fixed with respect to each other inasmuch as the length of rod 94 extending between the bearing openings 102 and 98 is fixed. The relative position of the sleeves 82 and 86 with respect to the sleeve 84 is controlled by the screw rod 94 actuated by handle 92. Turning the handle 92 in the clockwise direction will tend to move the inner sleeve 86 to the right in FIGS. 6, 7 and 8 and simultaneously outer sleeve 82 will move to the right with respect to middle sleeve 84. Counterclockwise operation of the rod 94 effects opposite movement of sleeves 82, 86 with respect to sleeve 84.

Figure 5:
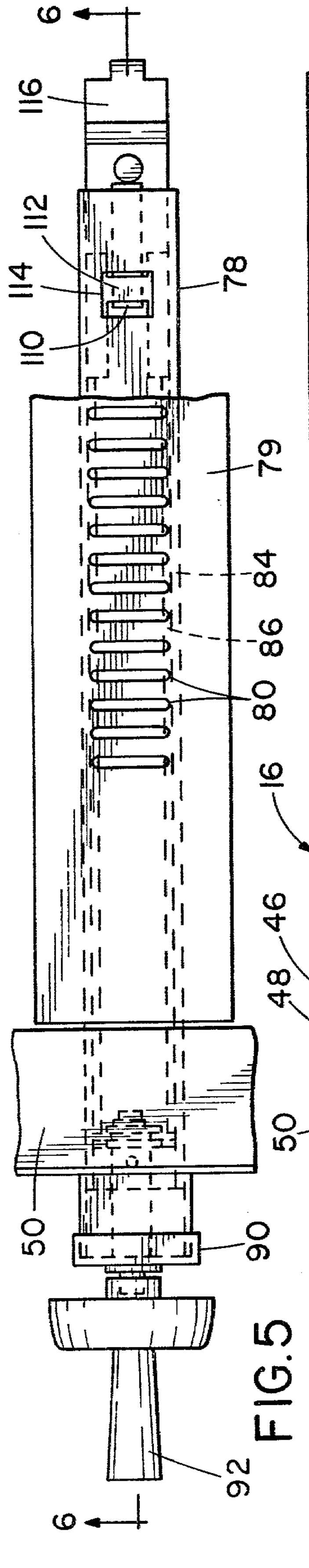
FIG. 5 is an enlarged top plan view of the vise for the workbench of the present invention.

A pawl 104 is fixed to the middle sleeve 84 and pivots about a rod or shaft 106 extending between the side walls of the sleeve 84. The shaft 106 is positioned eccentric with respect to the pawl 104 so that the long end 108 of the pawl 104 will cause the pawl 104 to rotate in a clockwise sense as shown in FIG. 5 due to gravity. In this manner, the tip or end 110 of the pawl 104 will pass through window or slot 114 in sleeve 84 and thereby tend to engage one of the many slots 80 positioned to receive the pawl 104.

Figure 7:
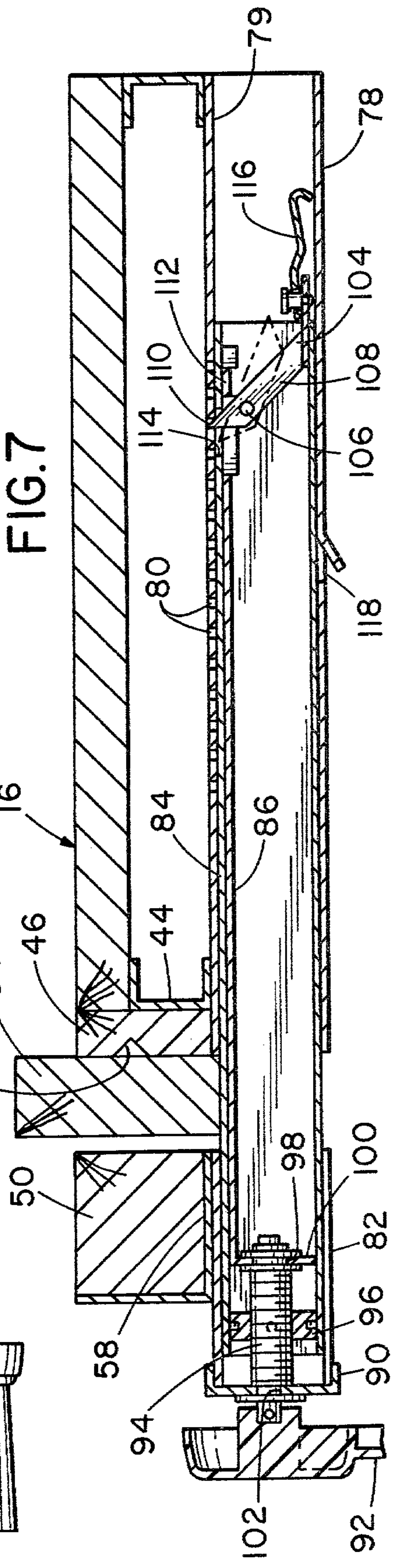
FIG. 7 is a side cross sectional view similar to FIG. 6 wherein the vise has been moved to a second position.
Figure 8:
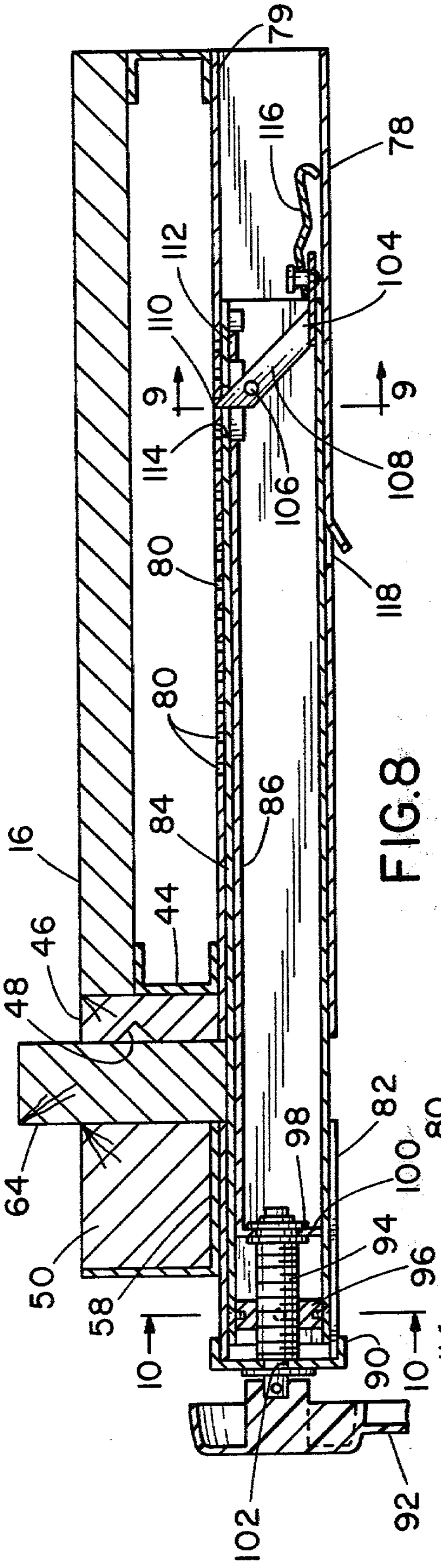
FIG. 8 is also a side cross sectional view of the vise similar to FIG. 6 wherein the vise has been further adjusted by the fine adjustment mechanism.

When the tip 110 engages a particular slot 80, the handle 92 may be rotated clockwise to draw the sleeve 82 onto the sleeve 84 and thereby decrease the distance between the block 96 and cap 90. The outer sleeve 82 and attached block 50 are thereby drawn toward the rail 46. In this manner, the vise 34 is tightened upon a workpiece 64 as shown in FIGS. 7 and 8. Reversing the rotation of handle 92 loosens the vise jaws 50, 46. Fine adjustment of the jaws 50, 46 is provided by this described mechanism.

To provide for gross adjustment of the vise jaws 50, 46, the inner sleeve 86 includes a pawl disengaging bridge member 112 which can travel to engage the end 110 of the pawl 104. Bridge member 112, importantly, is positioned on the side of the pawl 104 which permits engagement with the pawl 104 and pivotal movement in a counterclockwise sense to release pawl 104 from slot 80. The bridge 112 is moved to the position shown in FIG. 6 by translating sleeve 86 (as well as sleeve 82) to the left in FIG. 6 through the rotation of the rod 94 in block 96. This will cause the pawl 104 to be driven by bridge 112 and disengaged from a slot 80.

Figure 6:
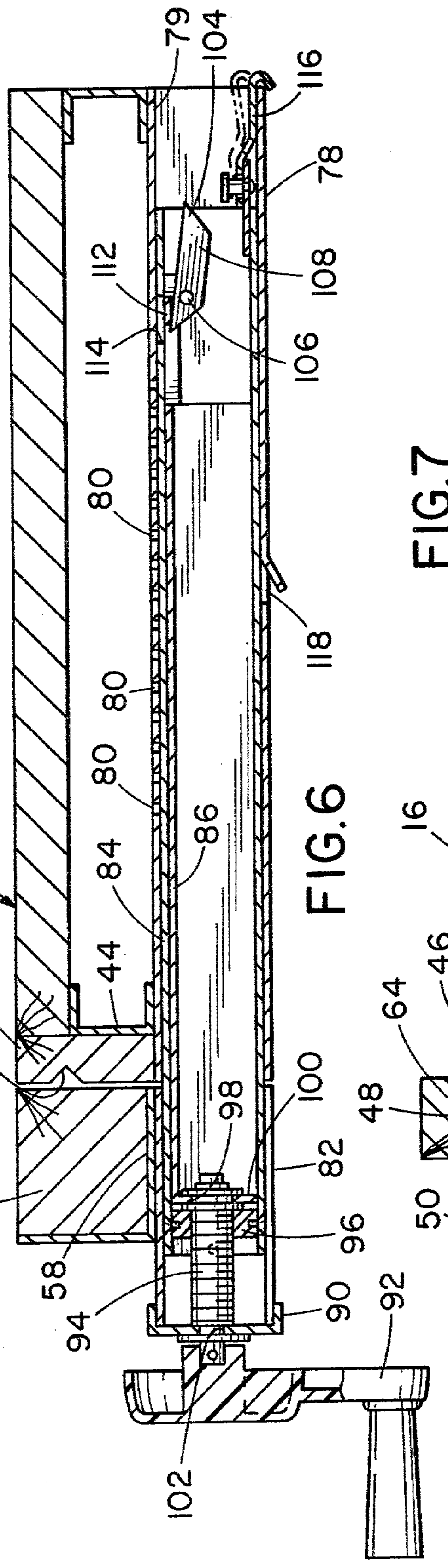
FIG. 6 is a side cross sectional view of the vise as shown in FIG. 5 taken along the line 6—6.

When in the position shown in FIG. 6, the entire assembly of sleeves 82, 84 and 86 may be manually positioned in a gross adjustment to accommodate a workpiece 64. That is, since pawl 104 is disengaged from the slots 80, the sleeves 82, 84, 86 may freely slide in sleeve 78. A workpiece inserted in the jaws 50, 46 can be accommodated by manually sliding the jaw 50.

Fine adjustment is then provided by turning the handle 92 in a clockwise sense. This releases the bridge 112 from engagement with pawl 104. Pawl 104, and, more particularly, the end 110, then engages in an appropriate slot 80. Further turning of the handle 92 will cause tightening of the vise.

A hook 116, which is spring biased, is attached to the end of sleeve 84. Hook 116 may engage a slot 118 in sleeve 78 to prevent total removal of the telescoping sleeves 82, 84 and 86. That is, translating the sleeves 82, 84, 86 to the left in FIG. 6 will ultimately cause the hook 116 to catch on slot 118 and prevent removal of the sleeves 82, 84, 86. Slot 118 is formed to permit automatic removal by sliding of hook 116 when movement is made in the right hand direction as shown in FIGS. 5-8.

In sequence, FIG. 6 represents the configuration for gross adjustment of the vise. FIG. 7 represents the vise after gross adjustment has been effected and initial movement of bridge 112 (sleeves 82, 86) has been effected so that pawl 104 engages a slot 80. FIG. 8 illustrates further rotation of handle 92 to position sleeves 82, 86 and jaw 50 tightly against the workpiece 64 since the pawl is positioned in a slot 80.

FIG. 13 illustrates a manner by which the center section 42 may be replaced with a special tool support center section 66. That is, the section 66 may be substituted in the top 16 for section 42. A power tool, such as a circular saw 68 or a router (not shown), which includes a working blade, for example, blade 70, may then be attached to the bottom of the center section 66. The top 16 of the workbench then serves as a worktable for the rotary saw 68 or a router (not shown) or any other desirable tool which is to be supported by the workbench. Note that the tool 68 is positioned beneath the workbench top 16 and projects through section 66 to avoid interference with a workpiece placed on the bench.

FIGS. 3 and 4 illustrate the attachment of horizontal support members 76 to the opposite sides of the top 16. Members 76 are supported by legs 72. A cross bar 74 connects members 76 and is adjustable to thereby provide a side guide bar for the table. In this manner a large workpiece may be supported by the workbench.

With the improved vise and workbench combination of the present invention it is possible to provide one, two, or more vise devices having both gross and fine adjustment on a workbench. The vises 34, 36 preferably have separate movable jaws 50 as shown. In this manner, support and maintenance of the workpiece 64 with respect to the top 16 is facilitated. The inclusion of the many other described features, including the pocket assembly 30, removable center section 42 and extension leg assembly, further enhances the utility of the workbench of the present invention.

Yet another feature of the invention is the provision for workpiece dogs 87 which may be inserted in openings in the top 16. Dogs 87 asist in holding a workpiece on top 16. The invention, therefore, is to be limited only by the following claims and their equivalents.

What is claimed is:

1. An improved workbench comprising, in combination:

(a) a top with a side edge rail;

(b) collapsible legs attached to and supporting the top;

(c) a vise member affixed to the top, said vise member including a gripping jaw in opposed relation to the side rail of the top, said vise member also including means for separately adjusting the spacing of the attached gripping jaw from the side rail; said means for adjusting including three slidably telescoped members, mounted for telescopic movement transversely with respect to the side edge rail; the outside member connected to the gripping jaw, the middle member including adjustable ratchet means for engaging cooperative means attached to the bench and thereby providing means for gross adjustment of the gripping head with respect to the side rail, the inside member including means for simultaneous movement with the outside member with respect to the middle member to thereby provide fine adjustment of the gripping jaw or release of the ratchet means.

2. The workbench of claim 1 wherein said gripping jaw includes at least one pin projecting from the outside member transverse to the direction of jaw travel, and a vise block including an arcuate opening for receipt of said pin and permitting pivotal movement and adjustment of the block with respect to the side rail.

3. The workbench of claim 1 including more than one separate vise member having a gripping jaw opposed to the side rail.

4. The workbench of claim 1 wherein said members comprise telescoping tube members slidably mounted in a tube attached to the bench.

5. The workbench of claim 1 including means for limiting the travel of the telescoping members.

6. The workbench of claim 5 wherein said means for limiting comprise a cooperating hook member and slot for engaging the movable telescoping members and the bench top.

7. The workbench of claim 1 wherein said ratchet means comprises a pivotal pawl mounted on the middle telescoping member and pivotal about an axis between a first projected position of engagement with the cooperative means and a second retracted position of non-engagement with the cooperative means, said inside member including a pawl engaging member for pivoting the pawl between the projected and the retracted position.

8. The workbench of claim 1 wherein said ratchet means and said cooperative means includes a pawl and a series of separate cooperative pawl engaging means spaced along the length of travel of the members telescoped.

9. The workbench of claim 1 wherein said means for simultaneously adjusting includes a connecting rotatable rod which maintains said inside and outside members a fixed, spaced distance, said rod being threadably extending through a block attached to the middle member.

10. The workbench of claim 9 including handle means for adjusting the vise.

11. The workbench of claim 1 including tool storage means attachable to the collapsible legs.

12. The workbench of claim 11 wherein said tool storage means comprise at least one open topped pocket attachable to the legs.

13. The workbench of claim 1 wherein said top is generally planar and includes at least one removable section.

14. The workbench of claim 1 including extension support legs affixed to the top for supporting oversized workpieces.

15. An improved workbench vise comprising in combination:

(a) fixed side member including a fixed jaw;

(b) a movable gripping jaw cooperatively attached to the fixed side member in opposed relation to the fixed jaw; and (c) means for separately adjusting the spacing of the movable jaw from the fixed jaw, said means for adjusting including three slidably telescoped members mounted for telescopic movement transversely with respect to the fixed jaw; the outside member being connected to the movable jaw, the middle member including adjustable ratchet means for engaging cooperative means attached to the fixed jaw and thereby provide gross adjustment of the movable jaw with respect to the fixed jaw, the inside member including means for simultaneously adjusting the longitudinal position of the inside and outside member with respect to the middle member to provide fine adjustment of the gripping head.

16. The vise of claim 15 including means on the inside member cooperative with the adjustable ratchet means to actuate and deactuate the gross adjustment mechanism.

17. An improved workbench comprising, in combination:

(a) a top with a side edge rail;

(b) leg members attached to the top in support thereof; and (c) at least one vise member attached to the top, said vise member including a movable gripping jaw in opposed relation to the side edge rail, said vise member also including a fixed support tube attached to the top cooperative with three telescoping tubes connected to the gripping jaw, said tubes having means for a gross adjustment and means for a fine adjustment of the position of the gripping jaw with respect to the side edge rail, said means for gross adjustment comprising a ratchet and pawl mechanism with means to render the ratchet and pawl mechanism inoperative by telescopic movement of the tubes relative to each other.

18. An improved workbench comprising, in combination:

(a) a top with a side edge rail;

(b) leg members attached to the top in support thereof; and (c) at least one vise member attached to the top, said vise member including a movable gripping jaw in opposed relation to the side edge rail, said vise member also including a fixed support tube attached to the top cooperative with three telescoping tubes connected to the gripping jaw and having means for a gross adjustment and means for a fine adjustment of the position of the gripping jaw with respect to the side edge rail, said means for fine adjustment comprising a rigid connection between the inner and outer tubes, said gripping head being connected to one of said tubes, and an adjustable connection between the middle tube and the inner tube and outer tube, said adjustable connection including means for simultaneous movement of the inner and outer tubes with respect to the middle tube.

19. An improved workbench comprising, in combination:

(a) a top with a side edge rail;

(b) leg members attached to the top in support thereof; and (c) at least one vise member attached to the top, said vise member including a movable gripping jaw in opposed relation to the side edge rail, said vise member also including a fixed support tube attached to the top cooperative with three telescoping tubes connected to the gripping jaw and having means for a gross adjustment and means for a fine adjustment of the position of the gripping jaw with respect to the side edge rail, said means for gross adjustment comprising a pawl mechanism with means rendered inoperative by telescopic movement of one of the tubes relative to the other two, said means rendering the gross adjustment inoperative including a driving section of one of the tubes engaged with the pawl mechanism to prevent operation of the pawl.

* * * * *